(12) United States Patent
Falk et al.

(10) Patent No.: US 12,316,777 B2
(45) Date of Patent: May 27, 2025

(54) METHOD FOR ISSUING A CRYPTOGRAPHICALLY PROTECTED CERTIFICATE OF AUTHENTICITY FOR A USER

(71) Applicant: Siemens Aktiengesellschaft, Munich (DE)

(72) Inventors: Rainer Falk, Poing (DE); Steffen Fries, Baldham (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 228 days.

(21) Appl. No.: 17/601,159

(22) PCT Filed: Mar. 17, 2020

(86) PCT No.: PCT/EP2020/057276
§ 371 (c)(1),
(2) Date: Oct. 4, 2021

(87) PCT Pub. No.: WO2020/200766
PCT Pub. Date: Oct. 8, 2020

(65) Prior Publication Data
US 2022/0182244 A1  Jun. 9, 2022

(30) Foreign Application Priority Data

Apr. 5, 2019  (EP) .................................... 19167507

(51) Int. Cl.
*H04L 9/32* (2006.01)
(52) U.S. Cl.
CPC ................. *H04L 9/3263* (2013.01)

(58) Field of Classification Search
CPC ..................... H04L 9/3263; H04L 63/0823
See application file for complete search history.

(56) References Cited

U.S. PATENT DOCUMENTS 6,671,804 B1 * 12/2003 Kent ................... H04L 63/0823
                                                            713/161
9,397,980 B1 * 7/2016 Chen ...................... G06F 21/33
(Continued)

FOREIGN PATENT DOCUMENTS

| CN | 104821933 A | 8/2015 | ............ H04L 29/06 |
| CN | 109309565 A | 2/2019 | ............ H04L 29/06 |

(Continued)

OTHER PUBLICATIONS

Search Report for International Application No. PCT/EP2020/057276, 12 pages, Jul. 13, 2020.
(Continued)

*Primary Examiner* — Khalid M Almaghayreh
(74) *Attorney, Agent, or Firm* — Slayden Grubert Beard PLLC

(57) ABSTRACT

Various embodiments of the teachings herein include a method for issuing a cryptographically protected certificate of authenticity for a user comprising: providing a public user key; providing a public client key for a client, the public client key assigned to the user; forming a request including the public user key, wherein the public user key is protected with the aid of a private client key assigned to the provided public client key; and issuing a cryptographically protected certificate of authenticity containing the public user key and identifying the client. The cryptographically protected certificate of authenticity contains or references a cryptographic client identifier formed depending at least in part on the public client key.

10 Claims, 2 Drawing Sheets

(56) References Cited

U.S. PATENT DOCUMENTS

| | | | |
|---|---|---|---|
| 9,736,145 B1* | 8/2017 | Hayes | H04L 63/0846 |
| 2012/0204032 A1* | 8/2012 | Wilkins | H04L 9/321 |
| | | | 713/170 |
| 2014/0245409 A1* | 8/2014 | Falk | H04L 63/0823 |
| | | | 726/6 |
| 2015/0222628 A1* | 8/2015 | Karroumi | G06F 21/445 |
| | | | 713/175 |
| 2017/0005810 A1* | 1/2017 | Pedersen | H04L 63/062 |
| 2018/0167812 A1* | 6/2018 | Nagarajamoorthy | H04W 4/80 |
| 2018/0227293 A1* | 8/2018 | Uhr | G06Q 20/40 |
| 2019/0052622 A1* | 2/2019 | Karroumi | H04L 9/3247 |
| 2019/0090132 A1* | 3/2019 | Li | H04L 63/0823 |
| 2020/0169406 A1 | 5/2020 | Liu et al. | |
| 2020/0366506 A1* | 11/2020 | Brockhaus | H04L 63/0823 |
| 2022/0020003 A1* | 1/2022 | Sarkar | H04L 9/3218 |

FOREIGN PATENT DOCUMENTS

| | | | |
|---|---|---|---|
| CN | 109547471 A | 3/2019 | H04L 29/06 |
| DE | 10 2013 203 101 | 8/2014 | H04L 9/32 |
| DE | 10 2015 101 014 | 7/2016 | H04L 9/30 |

OTHER PUBLICATIONS

Xufeng, Li et al., "Implementation of Client Server System Security Based on Digital Certificate," Computer Security, No. 8, pp. 14-16 (Chinese w/ English abstract & translation), Aug. 30, 2003.

Chinese Office Action, Application No. 202080025433.6, 21 pages, Nov. 16, 2022.

* cited by examiner

METHOD FOR ISSUING A CRYPTOGRAPHICALLY PROTECTED CERTIFICATE OF AUTHENTICITY FOR A USER

CROSS-REFERENCE TO RELATED APPLICATIONS

This application is a U.S. National Stage Application of International Application No. PCT/EP2020/057276 filed Mar. 17, 2020, which designates the United States of America, and claims priority to EP Application No. 19167507.3 filed Apr. 5, 2019, the contents of which are hereby incorporated by reference in their entirety.

TECHNICAL FIELD

The present disclosure relates to certificate of authenticity. Various embodiments of the teachings herein may include methods for issuing a cryptographically protected certificate of authenticity for a user, such as a digital certificate, in particular a device certificate, for a user and to associated mechanisms.

BACKGROUND

Within the present disclosure the term "security" refers to the security or protection, confidentiality, and/or integrity of data as well as its transfer and also security, confidentiality and/or integrity when corresponding data is accessed. The term "security" also includes authentication in the case of data transfers or data access. A module can be formed here as a hardware and/or functional unit, which can be configured in terms of software and/or firmware. The function can be performed, for example, by means of a processor and/or a storage device unit for storing program commands.

In a certificate-based system, each person or each object, for example, a device or a software process, receives a certificate of authenticity, such as a digital certificate, a data structure (or a data set), which contains details relating to its identity and a public key of the person or of the user of object or device. Each certificate is certified by an issuing authority by way of a digital signature, which for its part can be certified again by higher authorities. Since the digital signature comprises the complete data structure, the content thereof is integrity-protected thereby. The trust system of a Private Key Infrastructure (PKI) of this kind is hierarchical. What is known as a root certificate forms the shared trust anchor, and this has to be authentically configured in all relevant system components.

The authenticity and integrity of a digital certificate are also checked by way of the digital signature. For this, a value is calculated, which is called a digital signature, with the aid of a secret signature key, also referred to as a private key, in relation to a data set. This value allows anyone to check, with the aid of the associated public verification key, also referred to as a public key, the non-repudiated authorship and integrity of the data set. To be able to assign a signature created with a signature key to a user, the associated verification key has to be unequivocally assigned to this user. A certification authority will hereinafter also generally be referred to as a mechanism for issuing or issuing mechanism for certificates.

Storage of secret symmetrical and private asymmetrical keys in physically particularly protected security modules such as cryptographic processors, hardware security modules (HSM) or trusted platform modules (TPM) is likewise possible. A security module can also be implemented in terms of software/firmware. Secret or private keys can be brought into the security module or be generated therein. Conventionally, it is not possible, or is possible to only a very limited extent, to read out the keys from the security module.

A new, asymmetrical key pair can be generated for each device belonging to a user. The private key has to remain in the device and be reliably protected against unauthorized use and especially against reading and copying; the public key is authentically transported to a Certification Authority, abbreviated to CA, which can be configured as an issuing mechanism, which digitally signs it, together with other device data (serial number, type, manufacturer name, production date, etc.), in a data structure. To ensure that the owner of the public key and the associated device data is also in possession of the corresponding private key, the data set produced by the device is likewise frequently digitally signed with the appropriate private key of the device or user in order to protect transport from device to the CA. The device can be an IOT device or a different device, which has, for example, a security module.

Digital certificates are required, as a rule, for the authentication of users, in particular also for the authentication of devices or components of an industrial automation/control system. A digital certificate is conventionally—as described above—issued by a Public Key infrastructure (PKI). The structure and operation of a secure PKI are relatively complex, however. It is possible that one technical PKI authority is jointly used by a plurality of clients.

Although the technical PKI infrastructure is jointly used by a plurality of clients, from a logical perspective it appears as though one client would use his own PKI infrastructure in each case. Clients can be, for example, different operators of automation systems, different automation plant or different companies or business divisions, which each require a PKI infrastructure. Users, who are assigned to a client, can in this connection be device manufacturer service personnel or also service personnel of an automation/control system operator. Here the users assume various roles, in which manner they are given access to the devices and/or components of a user or a system in order to complete, for example, particular configuration or maintenance operations of a client. Via these roles the user is authorized to complete particular tasks on devices belonging to the user or system.

However, it is costly to securely set up and maintain a client in the PKI infrastructure. A client is typically a sector of the PKI that is locked for an operator and which is not shared with other operators.

SUMMARY

The teachings of the present disclosure include improved methods and mechanisms or systems or devices compared to the above-mentioned prior art. For example, some embodiments include a method for issuing a cryptographically protected certificate of authenticity (CERT) for a user (B1, B2, B3), having the following steps: providing a public user key, providing a public client key for a client, which is assigned to the user, forming a request (CSR), which contains the public user key and with the aid of a private client key assigned to the provided public client key is protected and/or digitally signed, and issuing a cryptographically protected certificate of authenticity, which contains the public user key and identifies the client, characterized in that the cryptographically protected certificate of authenticity contains or references a cryptographic client identifier (M-ID), which is formed dependent on the public client key.

In some embodiments, the request contains a client identifier dependent on the public client key.

In some embodiments, the client identifier is formed from the hash value of the public client key.

In some embodiments, the request for issuing the cryptographically protected certificate of authenticity is formed and/or transferred after an authentication of the user.

In some embodiments, the request is transferred via a communications link authenticated with the aid of a client identification or with the aid of the client identifier that has been formed.

As another example, some embodiments include a mechanism (CA) for issuing a cryptographically protected certificate of authenticity for a user with the aid of a provided public user key, having a verification unit, which is configured to issue a cryptographically protected certificate of authenticity, which contains the public user key and identifies the client, wherein it verifies the ownership by the client of a previous request for a certificate of authenticity, characterized in that the certificate of authenticity identifying the client contains or references a cryptographic client identifier, which can be formed dependent on the client key.

As another example, some embodiments include a mechanism (RA) for issuing a cryptographically protected certificate of authenticity for a user, having: a provision unit, which is configured to provide a public client key for a client, which is assigned to the user, and a generating unit, which is configured to form a request for issuing the cryptographically protected certificate of authenticity, wherein the request, which contains a public user key for the user, is protected and/or is digitally signed with the aid of the private client key assigned to the provided public client key and wherein the request contains a client identifier dependent on the public client key.

In some embodiments, the client identifier can be formed from the hash value of the public client key.

In some embodiments, the request for issuing the cryptographically protected certificate of authenticity can be formed and/or transferred after an authentication of the user.

In some embodiments, the request can be transferred via a communications link authenticated with the aid of a client identification or with the aid of the client identifier that has been formed.

As another example, some embodiments include a computer program product, which can be loaded directly into a storage device or one or more digital processor(s), comprising program code segments, which are capable of carrying out the steps of one or more methods as described herein.

BRIEF DESCRIPTION OF THE DRAWINGS

The above-described properties, features, and advantages of various embodiments of the teachings herein and the manner in which these are attained will become clearer and more comprehensible in connection with the following description of the exemplary embodiments, which will be explained in more detail in connection with the Figures. In the drawings, in a schematic representation.

DETAILED DESCRIPTION

Figure 1:
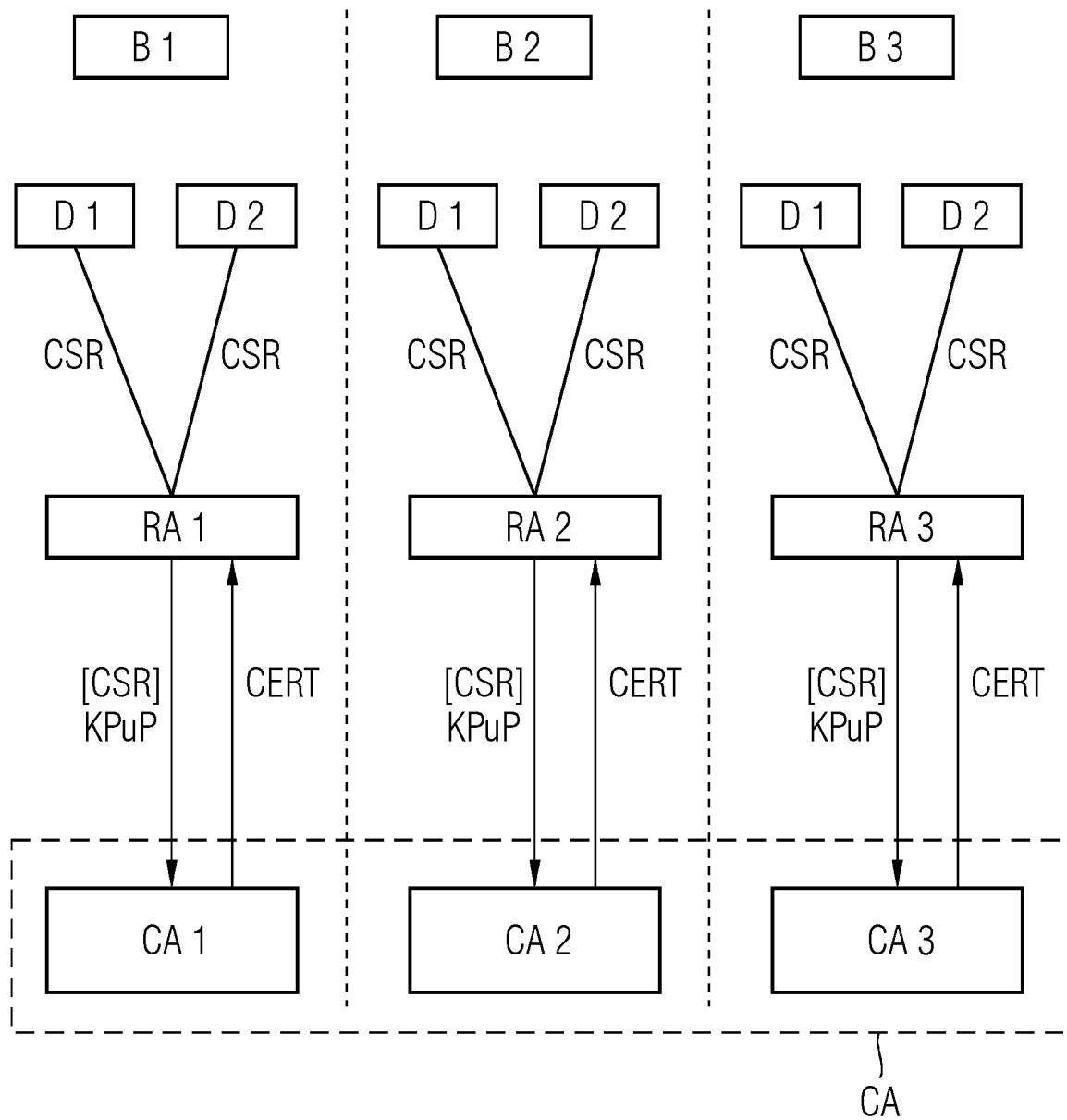
FIG. 1 shows an exemplary embodiment for the request or for the issue of certificates of authenticity incorporating teachings of the present disclosure.

Various embodiments of the teachings herein may include a method for issuing a cryptographically protected certificate of authenticity for a user, having the following steps:
  providing a public user key (of the user,
  providing a public client key for a client, which is assigned to the user,
  forming a request for issuing the cryptographically protected certificate of authenticity, wherein the request contains the public user key and with the aid of a private client key assigned to the provided public client key is protected and/or digitally signed, and
  issuing a cryptographically protected certificate of authenticity, which contains the public user key and identifies the client.

The client is identified in that the ownership of the request by the client will be or is verified or will be positively checked. The provided certificate of authenticity contains the public user key, as is generally customary. In addition, however, it contains an information element for identification or marking of the client, which has protected and/or digitally signed the request by means of its private client key.

In some embodiments, then, no explicit setting-up of clients in the PKI infrastructure is required. Clients are implicitly provided by the public client key with which a request for a certificate can be checked. As a result, a client can be set up completely automatically and optionally "on the fly" for each request for a certificate. Nevertheless it is ensured that the certificate of authenticity of a first client can be reliably differentiated from that of a second client.

A client can store further public keys, which are assigned to the public client key. Requests for a certificate by this client can then also be protected by the further private keys assigned to the public key in each case.

The request for a certification for a certificate of authenticity that identifies the user may contain or reference a cryptographic client identifier, which is formed dependent on the public client key. In some embodiments, a cryptographic client identifier is automatically added to a request for certification.

The "inquirer", in other words the respective client, thereby verifies/authorizes that the issuing of the certificate is admissible.

The request can comprise a client identifier dependent on the public client key. The client identifier can be formed from the hash value of the public client key.

The request for issuing the cryptographically protected certificate of authenticity for a user can be formed and/or transferred after an authentication of the client, it being possible for the request to be transferred via a communications link (for example TLS/IPsec/IKE) authenticated with the aid of a client identification or with the aid of the client identifier that has been formed.

The authentication of the request and, based thereon, the authorization can take place with an authority that forms and forwards the request, for example a Registration Authority (RA). Ultimately the authentication is a type of "Certificate issuance authorization identifier". The user or the authority (RA) that forms and forwards the request thereby verifies the admissibility of a certificate issuance.

Some embodiments include a mechanism, in particular a Certificate Authority (CA), for issuing a cryptographically protected certificate of authenticity for a user with the aid of a provided public user key, having a verification unit, which is configured to issue a cryptographically protected certificate of authenticity, which contains the public user key and identifies the client, wherein it verifies (or checks) the ownership and/or admissibility by the client of a previous request for a certificate of authenticity.

Some embodiments include a mechanism, in particular a Registration Authority (RA), for issuing a cryptographically protected certificate of authenticity for a user, having:

a provision unit configured to provide a public client key for a client, which is assigned to the user, and a generating unit configured to form a request for issuing the cryptographically protected certificate of authenticity, wherein the request, which contains a public user key for the user or is digitally signed therewith, can be protected and/or digitally signed with the aid of the private client key assigned to the provided public client key.

Some embodiments include a computer program (product) comprising program code which can be executed by a processor and which causes the processor to execute one or more of the methods described herein. The computer program can run on a mechanism of the above-mentioned type or be stored as a computer program product on a computer-readable medium.

FIG. 1 shows a procedure for the request or issue of certificates of authenticity. In FIG. 1, three different operators B1, B2, B3 or users use a local Registration Authority RA1, RA2, RA3 in order to authorize certificate requests. All three operators use a separate certificate issuer CA1, CA2, CA3 in each case, which issues the certificates in a manner specific to the operator. The three operators can also use a single certificate issuer CA (shown in broken lines). For this, each registration authority has an authenticated communications link to the issuer, for example CA, which can issue the certificates on the basis of the private client key used for the authentication. In the example, users, which are assigned to a client, assume different roles as to how they obtain access to the devices D1 and D2 or components of a user, for example B1 or a system, in order, for example, to complete particular configuration or maintenance operations. Via the roles the users are authorized to complete particular tasks on devices of the user or of the system of a client.

A public key KPUP of a client key pair (public, private keys) is used to identify a client. A cryptographic client identifier M-ID can be automatically ascertained thereby dependent on the client key pair used (for example as a hash value H of the public client key).

The request (Certificate Signing Request) CSR of a digital certificate CERT is protected by the client key, which is indicated in FIG. 1 by the square brackets. In particular, a request for a certificate can be digitally signed by the private client key assigned to the public client key, and this is marked by Sig. The request for a certificate CSR can also be transferred via a communications link (for example TLS, IPsec/IKE) authenticated by means of the private client key.

The protection by the private client key can occur by way of a client node, which is making the request (requester), itself or by way of an intermediate node, in particular by a registration authority RA, which, following a check of the message content, forwards a certificate request message to a certificate issuer CA. The cryptographic client identifier is contained or referenced in the issued certificates, which are requested for this client. It can be contained in the name CN (see FIG. 2) of the issued certificate and/or in the name of a client SubCA certificate. As a result, a client can only request certificates, which are also actually assigned to it (in other words, its cryptographic client identifier).

Figure 2:
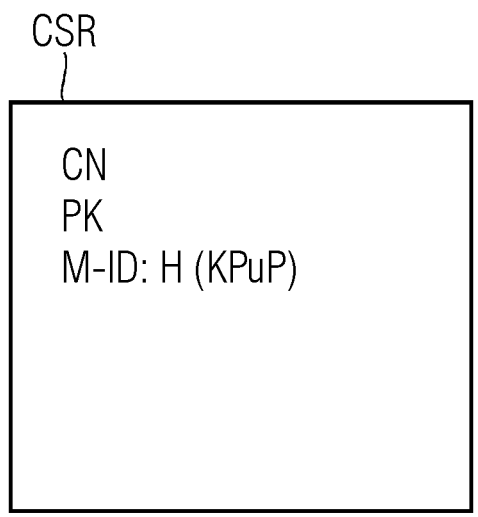
FIG. 2 shows an exemplary embodiment for a certificate request message incorporating teachings of the present disclosure.

In the process it is possible to check whether a request for a certificate contains the appropriate cryptographic client identifier. Only if this is the case is the certificate issued by the certificate issuer CA, in other words the certificate request message is digitally signed by the certificate issuer CA or a certificate CERT formed in accordance with the certificate request message CSR is digitally signed by the certificate issuer CA. The certificate request message—as indicated in FIG. 2—can also be modified by the appropriate cryptographic client identifier being entered.

In some embodiments, the certificate request message can be digitally signed with the private client key. The signature can be checked with the public client key. The signature can take place by way of client making the request, a certificate management proxy or by a registration authority RA. In some embodiments, the certificate request message can be digitally signed twice, once with the private key of the client or user making the request (in other words, with the private key whose assigned public key PK is to be verified by the certificate), and once with the private client key. For the digital signature, for example the re-signing of a request for a certificate from a CMP protocol (Certificate Management Protocol, IETF Standard RFC 4210)) can be used.

In the case of the use of an authenticated communications link for forwarding the request for a certificate, for example the use of EST (Enrollment over Secure Transport, IETF Standard RFC 7030) is possible. Here a TLS link (Transport Layer Security, IETF Standard RFC 5246) is established for the registration authority RA, which checks and authorizes the request for certification by the requester. A further TLS link is established by the RA for the issuing CA in which the private client key and a certificate of the associated client is used for authentication. A certificate containing the public client key can have set, for example, the Key Usage extension id-kp-cmcRA.

A client can store further public keys, which are assigned to the public client key. Requests for a certificate by this client can then also be protected with the further assigned public key. This application is flexible. A certificate may only be issued by the CA, for example, only if (in other words, a data structure corresponding to the content of the CSR signed) the request message already contains a field corresponding to a client identifier. Alternatively, the CA can also ascertain this information from the public client key (certificate).

Figure 3:
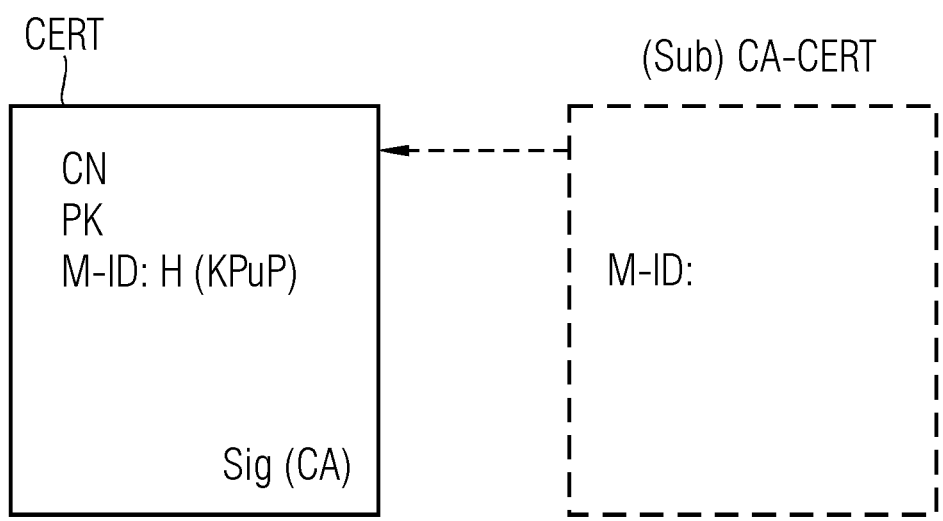
FIG. 3 shows an exemplary embodiment for a requested certificate incorporating teachings of the present disclosure.

The cryptographic client identifier can be encoded or inserted in any attribute of a certificate, for example Common Name CN—as shown in FIG. 3, Organizational Unit (OU) or AltName. It can also be implicitly contained (referenced), if the issued certificate is protected by a SubCA certificate (Sub)CA-CERT (see broken lines indicated in FIG. 3), which contains the cryptographic client identifier M-ID. In some embodiments, the name in the certificate is formed not just dependent on the public key of the client key, but also dependent on the public key PK of the device D1, D2 (Device Key) that is to be verified.

Examples for forming the client identifier include:
Concatenating the parts KPUP|PK
H(KPUP|PK)
HMAC(KPUP, PK), where denotes HMAC Key-Hashed Message Authentication Code.
In some embodiments, the CSR is signed twice:
Client Public Key (KPUP)
Device Public Key (PK)

In some embodiments, a Certificate Extension is included, which references this specific type of certificate issuance (via a CA Policy Extension or a separate Certificate Extension).

The following example shows an extension of this kind: id-on-ClientID OBJECT IDENTIFIER::={id-on 3}

```
ClientID : := SEQUENCE {
    ClientName      Name,
    ClientID        OCTET STRING,
    ClientCert      OCTET STRING OPTIONAL
}
```

This extension may be marked "critical" in the certificate since, during the validation, the extension is always also co-processed thereby. This ensures that not only the signature of the certificate issuer is checked, but also on whose instruction the certificate has been created. By way of appropriate security specifications (Security Policy) on the verifier's side, the verifier is thereby capable of exclusively using certificates, which were issued for a particular client.

The parameter ClientID can be, in particular, the hash value (for example SHA256, SHA3) of the public client key. The client identifier ClientID can be binary encoded or encoded as a string (for example as an ASCII string of the hexadecimal value).

The certificate validation or check can be carried out as follows:
  ascertain the cryptographic ClientID (whitelist), which is, for example, explicitly configured or implicitly from a separate certificate ("does the requestee (peer node) belong to the same client as the checking node or is the client known and accepted?".

If yes, then the certificate is accepted.

In some embodiments, a DNS name with cryptographic name component can also be formed in accordance with the certificate (for example for spontaneous web service in the case of node.js: a node can spontaneously set up an HTTPS service for a web service, in other words that a network name appropriate to the issued certificate is formed.)

Although the teachings herein have been illustrated and described in detail by the exemplary embodiments, the scope of the disclosure is not limited by the disclosed examples and a person skilled in the art can derive other variations herefrom without departing from the scope thereof.

The implementation of the above-described processes or procedures can occur on the basis of instructions, which are present on computer-readable storage media or in volatile computer storage devices (hereinafter collectively referred to as computer-readable storage devices). Computer-readable storage devices are, for example, volatile storage devices such as caches, buffers or RAM and non-volatile storage devices such as removable storage devices, hard disks, etc.

The above-described functions or steps can be present in the form of at least one set of instructions in/on a computer-readable storage device. The functions or steps are not bound to a particular set of instructions or to a particular form of sets of instructions or to a particular storage medium or to a particular processor or to particular patterns of execution and can be executed by software, firmware, microcode, hardware, processors, integrated circuits, etc. in sole operation or in any combination. A wide variety of processing strategies can be used in this case, for example serial processing by a single processor or multiprocessing or multitasking or parallel processing, etc.

The instructions can be stored in local storage devices, although it is also possible to store the instructions on a remote system and to access it via network.

The device or also the mechanism can in each case have one or more processor(s). The term "processor", "central signal processing", "control unit" or "data evaluation means", includes processing means in the widest sense, in other words for example servers, universal processors, graphics processors, digital signal processors, application-specific integrated circuits (ASICs), programmable logic circuits such as FPGAs, discrete analog or digital circuits and any combinations thereof, including all other processing means known to a person skilled in the art or developed in the future. Processors can comprise one or more mechanism(s) or system(s) or unit(s). If a processor comprises a plurality of mechanisms, they can be designed or configured for parallel or sequential processing or execution of instructions.

What is claimed is:

1. A method for transferring data between a client and a user, the method comprising:
    providing a generic public user key;
    providing a unique public client key for the client, the public client key assigned to the specific user;
    forming a request including the generic public user key, wherein the public user key is protected with the aid of a private client key assigned to the provided public client key;
    issuing a cryptographically protected certificate of authenticity containing the generic public user key, a certificate extension referencing a specific type of certificate issuance, and an information element identifying the client;
    wherein the cryptographically protected certificate of authenticity contains or references a cryptographic client identifier formed depending at least in part on the unique public client key; and
    transferring data between the user and the client only if the user has a valid certificate of authenticity with an approved certificate extension, else refusing the data transfer.

2. The method as claimed in claim 1, wherein the cryptographic client identifier is formed from a hash value of the public client key.

3. The method as claimed in claim 1, wherein the request for issuing the cryptographically protected certificate of authenticity is formed and/or transferred after an authentication of the user.

4. The method as claimed in claim 1, wherein the request is transferred via a communications link authenticated with the aid of a client identification or with the aid of the client identifier that has been formed.

5. A device for managing communication between a client and a user with the aid of a provided generic public user key, the device comprising:
    a verification processor programmed to issue a cryptographically protected certificate of authenticity;
    wherein the certificate of authenticity contains the generic public user key and an information element identifying the client;
    wherein the verification processor verifies the ownership by the client of a previous request for a certificate of authenticity;
    wherein the certificate of authenticity identifying the client contains or references a cryptographic client identifier formed at least in part based on a unique client key and a certificate extension referencing a specific type of certificate issuance; and wherein data transfer between the user and the client occurs only if the user has a valid certificate of authenticity with an approved certificate extension, else data transfer is refused.

6. A device for managing communication between a client and a user, the device comprising:

a provision processor programmed to provide a unique public client key for a client, the public client key assigned to the user; and a generating processor programmed to form a request for issuing the cryptographically protected certificate of authenticity including a certificate extension referencing a specific type of certificate issuance and an information element identifying the client;

wherein the request contains a generic public user key for the user and is protected and/or is digitally signed with the aid of a private client key assigned to the provided unique public client key; and wherein the request contains a client identifier dependent on the unique public client key; and wherein data transfer between the user and the client occurs only if the user has a valid certificate of authenticity with an approved certificate extension, else data transfer is refused.

7. The device as claimed in claim 6, wherein the client identifier is formed from a hash value of the public client key.

8. The device as claimed in claim 6, wherein the request for issuing the cryptographically protected certificate of authenticity is formed and/or transferred after an authentication of the user.

9. The device as claimed in claim 6, further comprising a communications link authenticated with the aid of a client identification, the communications link transferring the request.

10. A non-transitory recording medium storing a computer program product, when executed by one or more digital processor(s), causes the digital processors to carry out a method for managing communication between a client and a user, the method comprising:

providing a generic public user key;

providing a unique public client key for the client, the public client key assigned to the specific user, forming a request including the generic public user key, wherein the public user key is protected with the aid of a private client key assigned to the provided public client key; and issuing a cryptographically protected certificate of authenticity containing the public user key, a certificate extension referencing a specific type of certificate issuance, and an information element identifying the client;

wherein the cryptographically protected certificate of authenticity contains or references a cryptographic client identifier formed depending at least in part on the public client key; and wherein data transfer between the user and the client occurs only if the user has a valid certificate of authenticity with an approved certificate extension, else refusing the data transfer.

* * * * *